United States Patent [19]
Fitch et al.

[11] Patent Number: 4,778,948
[45] Date of Patent: Oct. 18, 1988

[54] CABLE JOINT

[75] Inventors: Anthony R. L. Fitch; Evan Jarrett, both of Swindon, United Kingdom

[73] Assignee: Raychem Limited, United Kingdom

[21] Appl. No.: 71,551

[22] Filed: Jul. 9, 1987

Related U.S. Application Data

[63] Continuation of Ser. No. 783,253, Oct. 1, 1985, abandoned, which is a continuation of Ser. No. 637,459, Aug. 4, 1984, abandoned.

[30] Foreign Application Priority Data

Aug. 4, 1983 [GB] United Kingdom ............... 8321010

[51] Int. Cl.$^4$ ............................................. H02G 15/08
[52] U.S. Cl. .................... 174/88 R; 29/859; 29/869; 156/49; 174/71 R; 174/88 C; 174/92; 174/DIG. 8
[58] Field of Search ................ 174/71 R, 72 R, 84 R, 174/84 C, 88 R, 88 C, 92, DIG. 8; 156/49; 29/859, 869

[56] References Cited

U.S. PATENT DOCUMENTS

| | | | |
|---|---|---|---|
| 3,141,060 | 7/1964 | Norton | 174/88 R |
| 3,441,658 | 4/1969 | Stark et al. | 174/88 R |
| 3,441,659 | 4/1969 | Laudig et al. | 174/88 C |
| 3,836,699 | 9/1974 | Downing | 174/88 R X |
| 3,872,237 | 3/1975 | Eyre et al. | 174/88 C |
| 3,957,382 | 5/1976 | Grevel, Jr. et al. | 174/DIG. 8 X |
| 4,035,534 | 7/1977 | Nyberg | 174/73 R X |
| 4,144,404 | 3/1979 | De Groef et al. | 174/88 C |
| 4,207,364 | 6/1980 | Nyberg | 174/73 R X |
| 4,271,329 | 6/1981 | Perelmuter | 174/84 R |
| 4,304,616 | 12/1981 | Richardson | 174/73 R X |
| 4,304,959 | 12/1981 | Vidakovits et al. | 174/84 R |
| 4,467,002 | 8/1984 | Crofts | 174/DIG. 8 X |
| 4,484,022 | 11/1984 | Eilentropp | 29/869 X |
| 4,500,371 | 2/1985 | De Groot | 156/48 |

FOREIGN PATENT DOCUMENTS

| | | | |
|---|---|---|---|
| 1564 | 5/1979 | European Pat. Off. | 174/84 R |
| 2320273 | 11/1974 | Fed. Rep. of Germany | 174/84 R |
| 2758094 | 3/1979 | Fed. Rep. of Germany | 156/49 |
| 473497 | 7/1969 | Switzerland | 174/DIG. 8 |
| 2046032A | 11/1980 | United Kingdom . | |

Primary Examiner—Morris H. Nimmo
Attorney, Agent, or Firm—Herbert G. Burkard

[57] ABSTRACT

An arrangement for forming a joint between electrical cables comprises a connector arrangement, e.g. a crimp connector, a fusible block capable of being positioned to enclose the connector and a heat-shrinkable sleeve having a recovery temperature at least 10° C. above the melting point of the fusible block. Preferably the fusible block is formed from a number of interlocking component parts. The arrangement is particularly suitable for forming joints between submarine cables, and may include a tubular shield portion for connecting the shields and shielded cables.

18 Claims, 6 Drawing Sheets

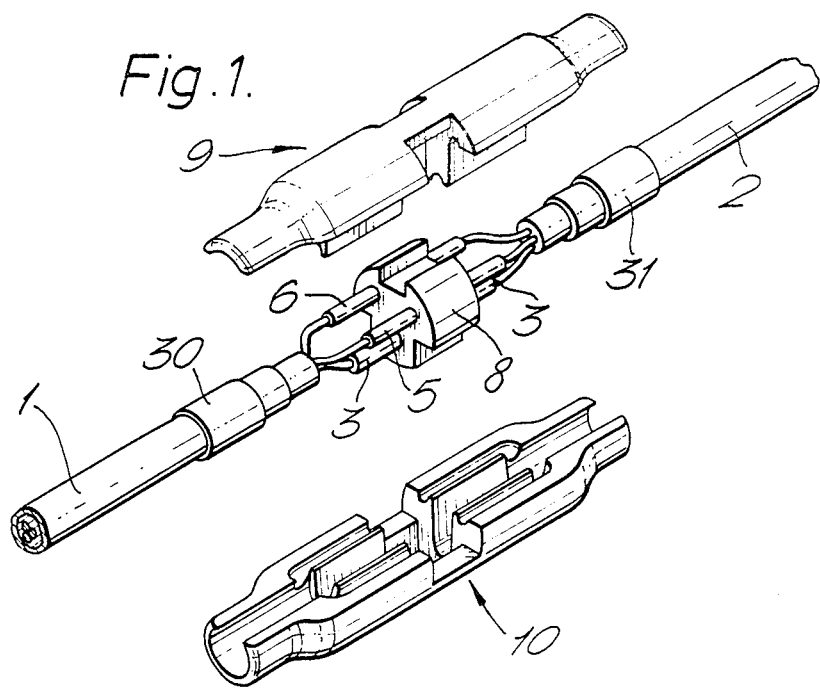
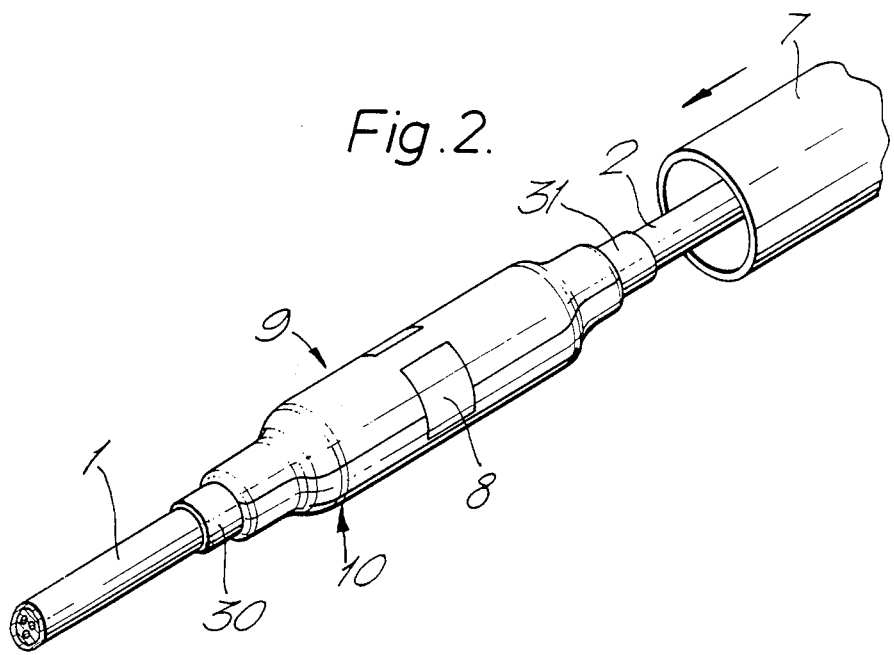

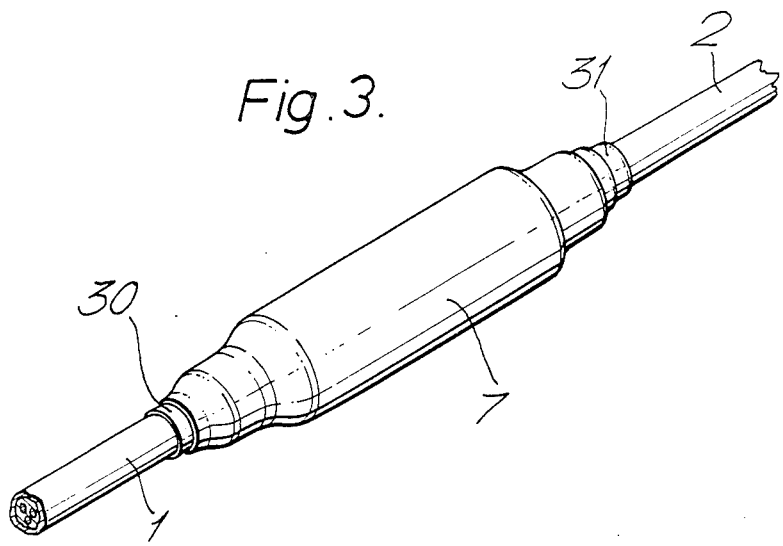
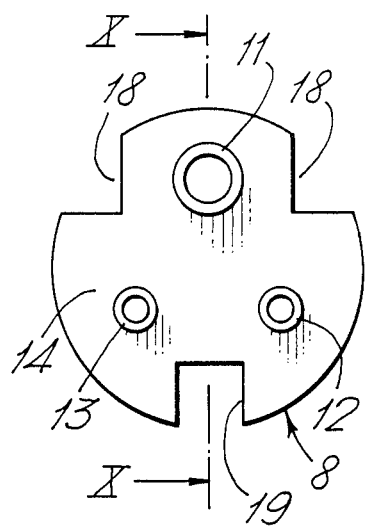
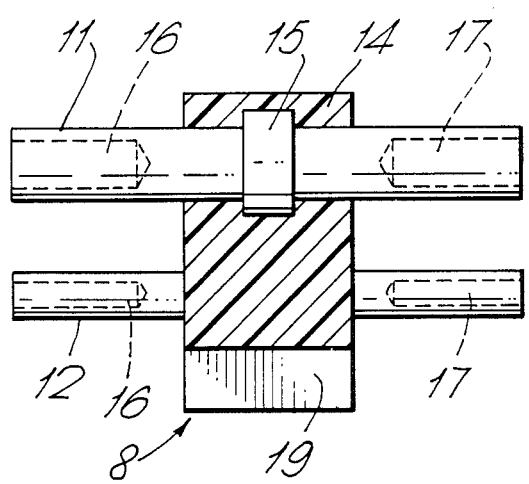

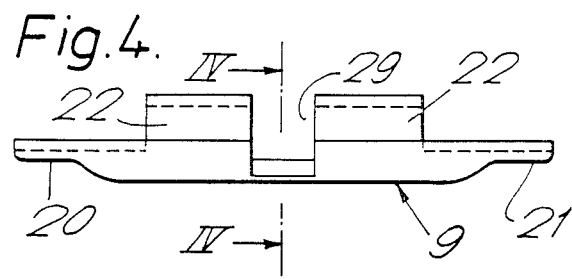
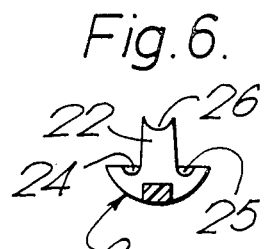
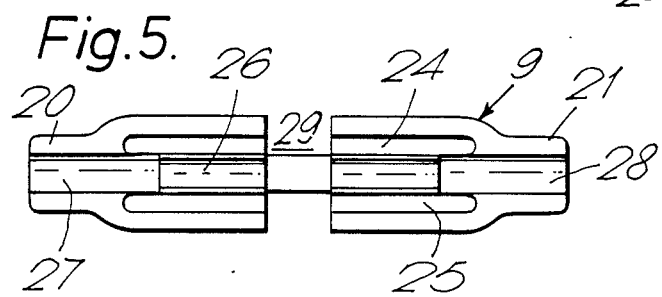
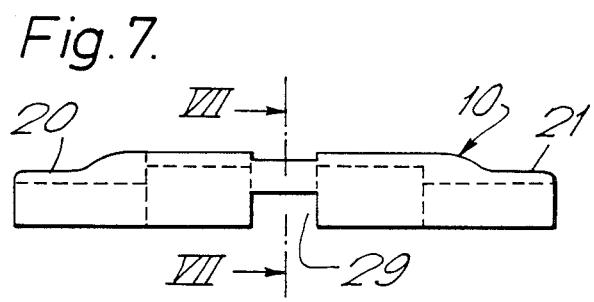
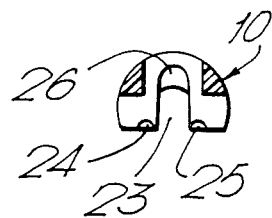
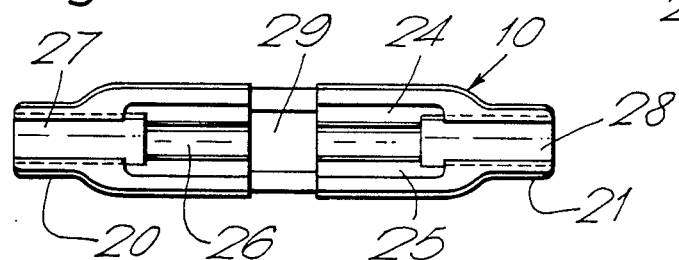

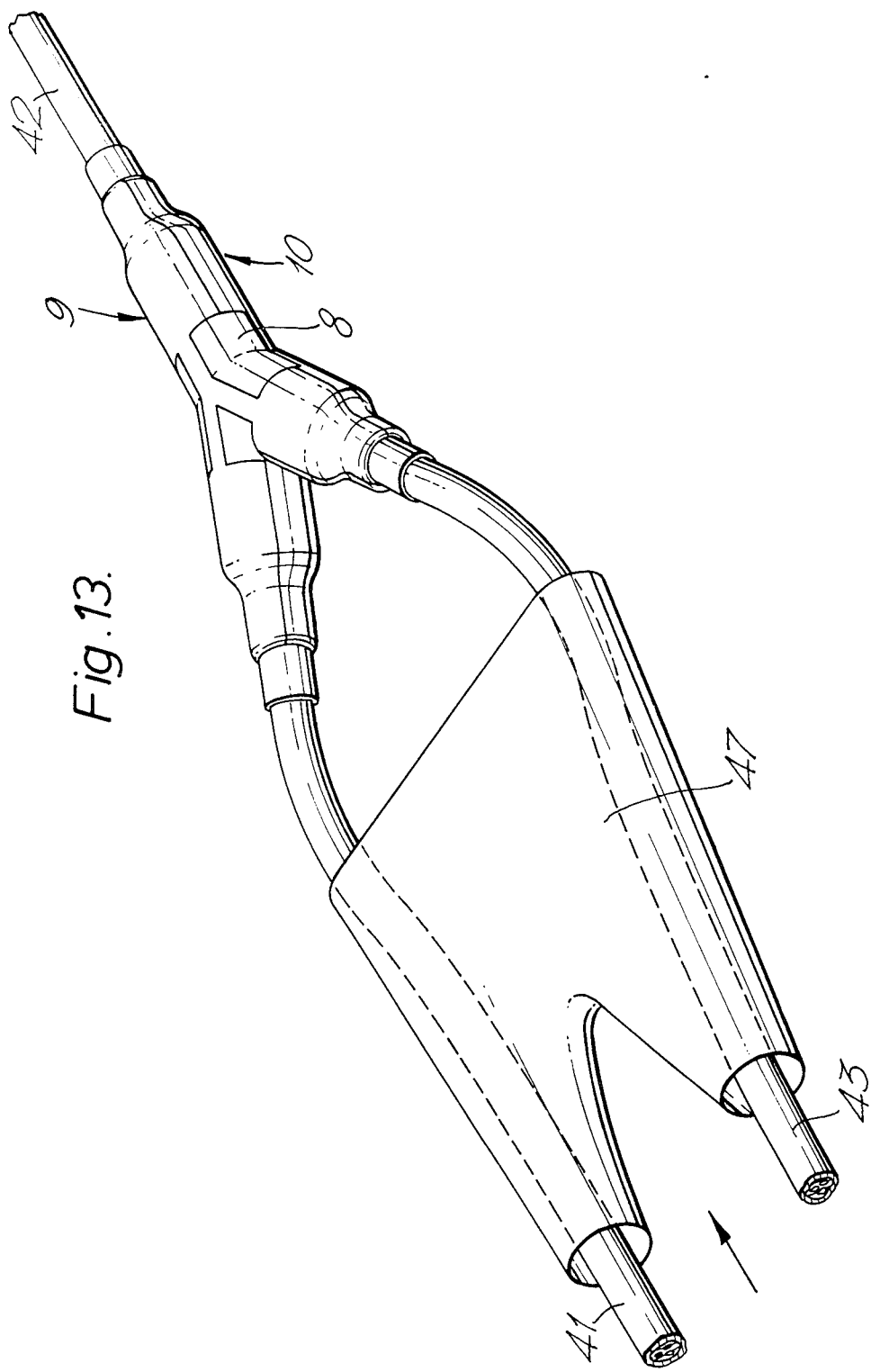

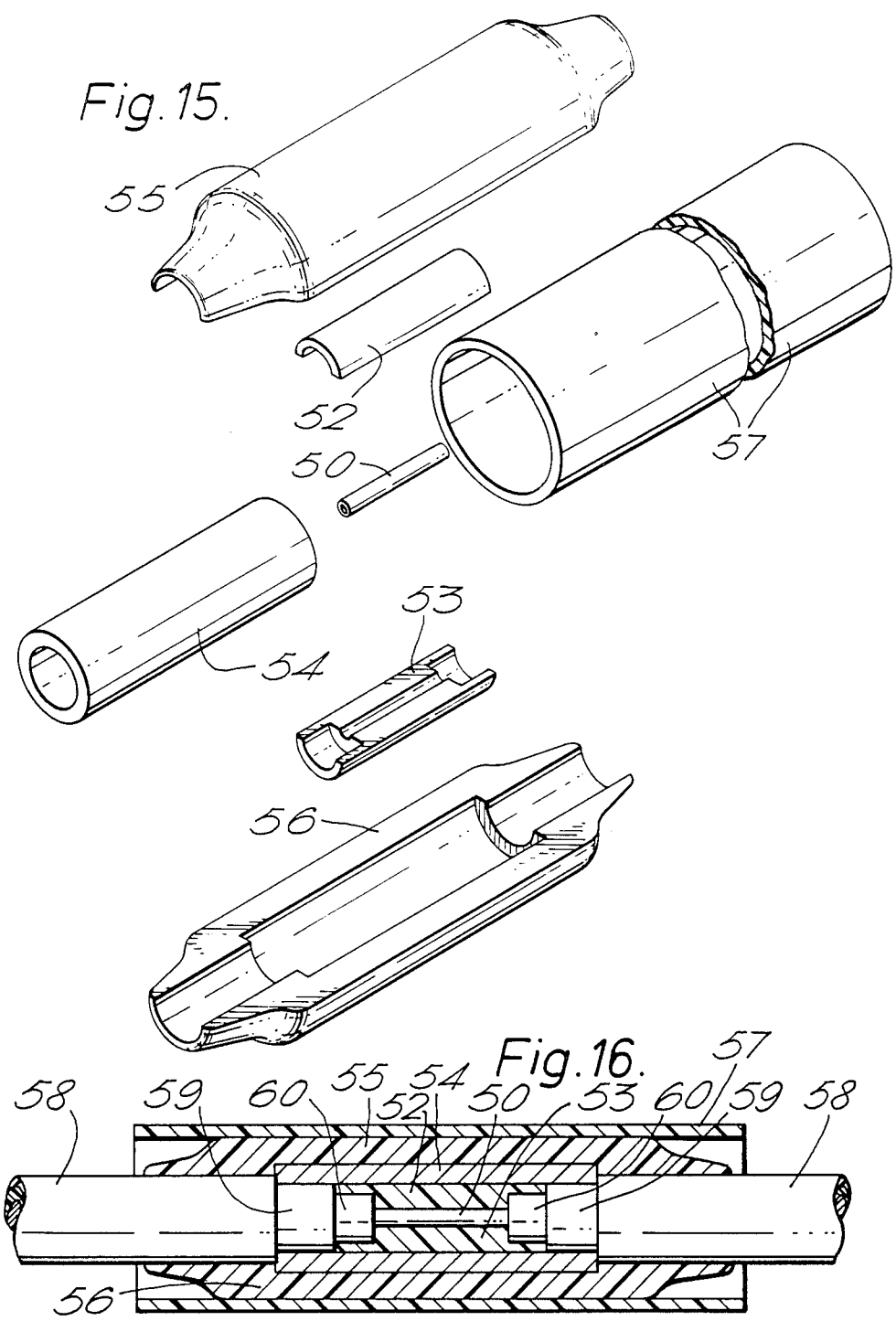

CABLE JOINT

This application is a continuation of application Ser. No. 783,253, filed Oct. 1, 1985, now abandoned, which in turn is a continuation of Ser. No. 637,459, filed Aug. 4, 1984, now abandoned.

This invention relates to arrangements for forming joints in electrical cables and especially for forming joints in cables that are intended to be submerged in water.

Such cables may be employed for a number of purposes, for example for towing sonar hydrophones from surface or underwater vessels, and will usually be required to withstand considerable hydrostatic pressures in use. Accordingly it is a principal requirement that any joint in the cable must also be able to withstand such hydrostatic pressure and, in addition, it is desirable that the joint be able to withstand an internal pressure difference between the different jointed sections of the cable in order to isolate any leaks to a single section of the cable.

In the past joints in such cables have been formed by connecting the wires together and placing the connected portion of the cables in an injection moulding apparatus in which potting compound is injected around the wires. Not only is this technique very time consuming but it requires the use of large quantities of power which can be highly inconvenient.

The present invention provides an arrangement for forming a joint between a plurality of electrical cables each of which comprises one or more electrical wires enclosed by a cable jacket, which arrangement comprises:

(a) a connector arrangement for forming electrical connections between wires of the cables;

(b) a fusible block formed from a thermoplastic polymer which is capable of being positioned about the connector arrangement substantially to enclose the connector arrangement and connected wires; and (c) a heat-shrinkable sleeve which can be positioned around the fusible block and proximate ends of the cables and recovered thereon, the sleeve having a recovery temperature of at least 10° C. above the melting point of the thermoplastic polymer.

The arrangement according to the invention enables a joint having the required resistance to pressure to be formed in an underwater cable in a relatively quick and simple manner. In fact, in contrast with current techniques for joining underwater cables which may take a number of hours per joint to complete, the present invention enables a joint to be formed in a matter of minutes. In order to form a joint between a plurality of cables the cable jacket is cut back to expose the electrical wires and an electrical connection is formed between wires of the different cables. The fusible block is positioned about the wires to enclose the wires connections and the proximate ends of the cable jacket and the heat-shrinkable sleeve is then positioned around the fusible block and the proximate ends of the cable jackets. When all the components have been assembled the heat-shrinkable sleeve and fusible block are heated, for example by means of a hot air gun, to cause the fusible block to melt and the sleeve to recover about the block and cable ends. When the components are heated, the heat-shrinkable sleeve recovers about the fusible block and the cable jacket ends and then the fusible insert begins to melt and flow around the connected wires, the polymer forming the fusible block being prevented from flowing away from the joint region or from dripping by means of the recovered sleeve. When the fusible block has completely or at least substantially melted the arrangement is allow to cool whereupon the temperature of the recovered sleeve falls below the crystalline melting point of the sleeve material while the polymer of the fusible block is still molten. As the arrangement continues to cool, the sleeve contracts by a relatively small extent as compared with its initial recovery but exerts a much higher radial force on the block due to thermal contraction thereby forcing the polymer of the fusible block into close conformity with the enclosed wires and connections. As the arrangement cools further the polymer forming the fusible block resolidifies and, when the arrangement reaches ambient temperatures, the joint has been completed and is ready for use.

Preferably, the fusible block is made up from a plurality of individual component blocks which can be assembled together about the connector arrangement and connected wires. This has the advantage that it is not necessary to slide the fusible insert along one of the cables before the connection is made, and also has the advantage that the component blocks may be given such configurations that, when they are assembled together about the connector arrangement, the fusible block so formed has substantially no internal voids. With this arrangement it is relatively easy to ensure that in the completed joint there are substantially no trapped air bubbles that could lead to ingress of water to the wires. In order to insulate the different connections from one another it is possible for the individual connectors of the connector arrangement to be insulated, for example by enclosing each connector in a sleeve of polymeric material, e.g. a heat-shrinkable sleeve. However, it is preferred for the individual connectors to be set in spaced-apart relationship in a supporting block which may be, and preferably is, formed from the same polymeric material as the fusible block, so that a single integral block is formed. The supporting block may be cross-linked if desired in order to retain the individual connectors in their original relationship but this is not necessary.

The connector arrangement preferably comprises at least one crimp connector for forming a connection between the cable wires although other connectors, e.g. solder connectors may be used if desired instead of, or in addition to, crimp connectors. Whatever form of crimp connector is used it preferably has a hollow portion for receiving the wires to be connected and a solid cross-section along part of its length, the solid cross-section providing a barrier to prevent water that may have penetrated the wires of one of the cables from passing through the joint to the other cable.

The polymer forming the fusible block preferably has a melting point in the range of from 110° to 160° C. and/or a melt flow index of from 1 to 3, and especially from 1.5 to 2.5 (measured by BS 2782 method 105C procedure A). Although any of a number of polymers may be used, it is expedient for the polymer to be capable of fusing with the cable jacket when heated. Thus it should have a similar melting point and preferably a similar surface energy or polarity as that of the cable jacket material, and especially comprises substantially the same polymer as that on which the cable jacket is based. The preferred polymers include ethylene homo- or copolymers, e.g. with $C_3$–$C_6$ alpha olefins. Preferred polyolefins are high, low or medium density polyethyene and especially low density polyethylene. Thus, when the cable joint has been formed according to the invention, the fusible block preferably provides a single integral block which encapsulates the wire connections and the ends of which are fused with the proximate ends of the cable jackets to provide a completely impervious barrier to ingress of water. In addition, it is possible to form the block from materials that will cure after melting to form a thermoset.

In other cases, for example where the cable jacket is formed from a cross-linked polymer, it may not be possible for the polymer forming the fusible block to fuse with the cable jacket, in which case the or each fusible block is preferably formed from a polymer which, after fusing, will form a strong adhesive bond to the cable jacket material. Thus the thermoplastic block or blocks may be formed from a polymeric material conventionally used as a hot-melt adhesive, examples of which include polyamide adhesives such as those described in U.S. Pat. Nos. 4,018,733 to Lopez et al and 4,181,775 to Corke, the disclosures of which are incorporated herein by reference.

As stated above the sleeve that is positioned around the fusible block is heat-shrinkable. A heat-shrinkable article is an article the dimensional configuration of which may be made substantially to change when subjected to heat treatment.

Usually these articles recover, on heating, towards an original shape from which they have previously been deformed but the term "heat-shrinkable," as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described for example, in U.S. Pats. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat recoverable articles, the polymeric material may be cross-linked at any stage in the production of the article that will enhance the desired dimensional recoverability. One manner of producing a heat-recoverable article comprises moulding the polymeric material onto the desired heat-stable form, subsequently cross-linking the polymeric material heating the article to a temperature above the crystalline melting point or, for amorphous materials, the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating, weakens and thus allows the elastomeric member to recover.

Preferably the heat-shrinkable sleeve is capable of exerting a maximum force in the circumferential direction (per unit cross-sectional area of its wall) of at least 4, more preferably at least 5, especially at least 6 and most especially at least 7 MPa during or after recovery. A typical wall thickness for the sleeve is 0.5 mm which corresponds to a recovery force of at least 2, preferably at least 2.5, especially at least 3 and most especially at least 3.5 kN per metre of axial length. Although some heat-shrinkable materials will be capable of exerting forces of such magnitude as they recover when heated, it will be more usual for the sleeve to exert a lesser force on recovery and then, when the sleeve is allowed to cool to ambient temperatures after recovery, to exert such a force through thermal contraction. Since the recovery temperature of the heat-shrinkable sleeve is higher than the melting point of the fusible block and since the heated assembly will be cooled from its exterior surface so that the temperature of the sleeve will be lower than the temperature of the block on cooling, the forces will be applied by the sleeve onto the fused polymer of the block and so force it to conform with the underlying cable and wire connections. Preferably the sleeve has a recovery temperature at least 20° C. and especially at least 30° C. above the melting point of the fusible insert, e.g. in the range of from 160° to 200° C., especially from 170° to 190° C. The preferred materials for forming the heat-shrinkable sleeve are described in British Patent Application No. 2,088,397 A, the disclosure of which is incorporated herein by reference. Of these materials, nylon 12 is most preferred. Alternatively or in addition, if desired, high recovery force materials e.g. heat shrinkable fibres or fabrics may be incorporated in the sleeve to provide the recovery force. Also it is preferred for the heat-shrinkable sleeve to be substantially transparent at least above its recovery temperature and for the polymer forming the fusible block to be substantially transparent at least above its melting point. This may be achieved by appropriate choice of base polymers and by ensuring that the materials contain no opaque fillers such as carbon black. With this preferred arrangement it is possible visually to inspect the joint when the sleeve and fusible block are hot to ascertain that no trapped air bubbles exist in the joint. The ability to inspect the joint usually enables the joint inspection to be performed immediately instead of resorting to X-ray testing required with previous joints.

The arrangement according to the invention may be used to form one-to-one joints in which a pair of cables are jointed or it may be designed to form so-called branch-outs in which three or more cables are jointed. Also it is possible to design the arrangement such that it can be used to pass a cable through a bulkhead if desired.

The arrangement according to the invention may also be used to form a joint between cables having a shield, e.g. coaxial cables. If it is desired to provide the cables with 360° shielding in the joint region, then the arrangement may include an electrically conductive tubular shield portion capable of being positioned about the connector arrangement and of being electrically connected to each cable shield. In this arrangement a number of fusible blocks will be provided, at least one fusible block being positioned about the connector arrangement (and possibly being formed in one piece with the connector arrangement) for location within the shield portion, and one or more blocks being positioned, or capable of being positioned, about the shield portion. The shield portion can be in any of a number of forms, for example in the form of a hollow metal tube, and may be connected to the cable shields for example by crimping or soldering. Preferably the shield portion is in the form of a tubular metal braid and especially a solder-impregnated braid so that a solder connection is formed between the cable shields when the arrangement is assembled and heated.

The invention will now be described by way of example with reference to the accompanying drawings in which:

FIG. 1 is an exploded perspective view of certain components of the joint arrangement during assembly;

FIG. 2 is a perspective view of the assembled components of FIG. 1;

FIG. 3 is a perspective view of the completed joint;

FIGS. 4 and 5 are side views of a fusible component block of the arrangement shown in FIG. 1;

FIG. 6 is a section along the line IV—IV of FIG. 4;

FIGS. 7 and 8 are side views of another fusible component block of the arrangement shown in FIG. 1;

FIG. 9 is a section along the line VII—VII of FIG. 7;

FIGS. 10 and 11 are views of the connector arrangement shown in FIG. 1;

FIGS. 12 and 13 are perspective views of another form of joint according to the assembly during installation;

FIG. 15 is an exploded view of an arrangement according to the invention for forming a joint in a coaxial cable; and FIG. 16 is a section taken along the axis of an assembled joint in a coaxial cable formed by the arrangement of FIG. 15 before heating.

Figure 12:
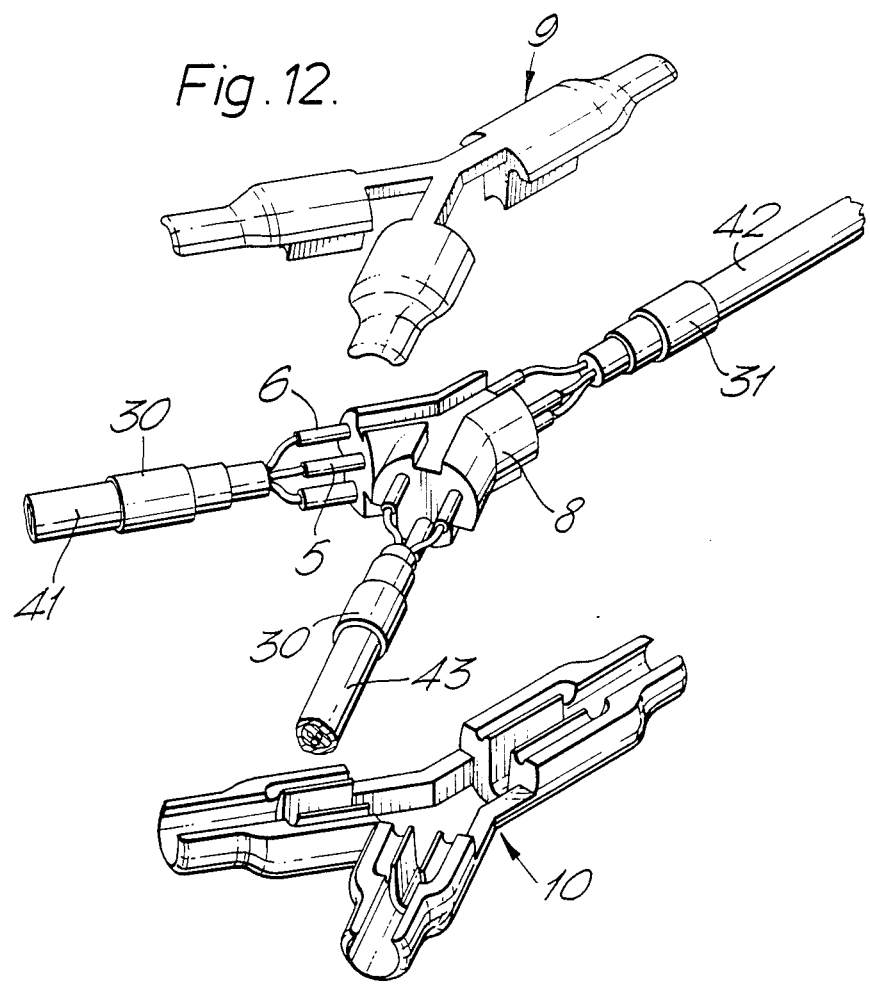

Referring to the accompanying drawings, a pair of polyethylene jacketed cables 1 and 2 are prepared for jointing by cutting back the cable jacket of each cable by about 23 mm to expose the braided shield. The braid is then combed into a number of strands which are twisted together to form a tail 3. The inner jacket (not shown) is cut back to expose a pair of insulated wires 5 and 6 which are stripped of insulation for about 6 mm of their length.

After a heat-shrinkable nylon 12 tube 7 has been slipped over the end of one of the cables, the wires 5 and 6 and the shield tails 3 of each cable are connected to the wires 5 and 6 and shield tail respectively of the other cable by means of a crimp connector arrangement 8 as shown in FIGS. 10 and 11. Two fusible component blocks 9 and 10 formed from low-density polyethylene by injection moulding are then assembled around the wires 5 and 6, the shield tails 3 and connector arrangement 8 and snap-fitted together as shown in FIG. 2. The length of each component block (about 90 mm) is sufficient to enclose the entire length of the exposed wires and to enclose the proximate end of the cable joint jacket of each cable 1 and 2. After sliding the heat-shrinkable sleeve 7 around the fusible blocks 9 and 10 the assembly is heated by means of a hot air gun for a period of four minutes whereupon the sleeve 7 recovers about the blocks 9 and 10 and the blocks melt. When the blocks melt they fuse with the proximate ends of the cable jackets to form a strong impervious bond and encapsulate the connected wires. After heating the assembly, and when it is still hot, the component blocks 9 and 10 and the sleeve 7 are transparent so that the joint may be visually inspected in order to ensure that it is free of trapped air bubbles. When the joint has cooled to ambient temperatures the cable is ready for use.

The preferred heating tool is a standard 2.2 KW hot air gun that has been modified by incorporating a 12 cm×8 cm×6 cm metal box into which the hot air is passed via a gauze diffuser. The joint is supported by means of finned aluminum clamps that grip the cable jacket on either side of the joint and act as a heat sink to protect the cable jacket from overheating.

The connector arrangement 8 is shown in FIG. 10 and in FIG. 11 which is a section along the line x—x of FIG. 10. The connector arrangement 8 comprises three copper crimp connectors 11, 12 and 13 for receiving the shield tails 3 and the wires 5 and 6 of the cables, the crimp connectors being set in a block 14 of the same low density polyethylene as used to form the component blocks 9 and 10. Each crimp connector is in the form of a tube having hollow end portions 16 and 17 for receiving the wires, and a central portion 15 which is solid and has a larger diameter in order to retain the connectors securely in the block 14. The solid central portion 15 also prevents any water that may have penetrated a wire conductor of one section of cable from passing through the crimp.

The block 14 has a generally cylindrical shape with cut-out portions 18 and 19 to enable the fusible blocks 9 and 10 to be fitted on it. Since the block 14 is formed from the same material as the fusible component blocks 9 and 10, they will all fuse together to form a single integral encapsulating mass when the joint is used.

The two component blocks 9 and 10 are shown in greater detail in FIGS. 4 to 9. Component blocks 9 and 10 each have an external surface that forms part of a circular cylinder having ends 20 and 21 of reduced radius. The component block 9 has a raised section 22 in its internal surface that fits into recess 23 of component block 10 so that, when the component blocks are pressed together, the resulting block is solid with the exception of channels formed by depressions 24, 25 and 26 for the cable wires, inlets 27 and 28 for the proximate ends of the cables and a central recess 29. The central recess has a shape and size corresponding to the shape and size of the block 14 of the connector arrangement 8. Thus when the component blocks 9 and 10 are positioned together around the wires and connector arrangement, substantially no significant volumes of air are enclosed.

If desired two small heat-shrinkable protecting sleeves 30 and 31 may be recovered about the cable jackets at such a distance from the ends of the cable jackets that they will lie just beyond the ends of the component blocks 9 and 10. The protecting sleeves 30 and 31 are preferably formed from a material having a recovery temperature between the melting point of the polyethylene cable jackets and the recovery temperature of the heat-shrinkable sleeve 7, e.g. from polyvinylidine fluoride, in order to protect the cable jacket from melting as the sleeve 7 is recovered thereon.

The joint formed as described above was tested by applying an internal pressure of water of 138 kPa (20 p.s.i.) in one cable for five minutes and detecting whether any water leaked from the other cable. The joint was then tested by applying an external water pressure of 17.25 MPa (2500 p.s.i.) to the joint region and detecting whether any water leaked into the cable. No failure (leakage) of the joint was recorded.

Figure 14:
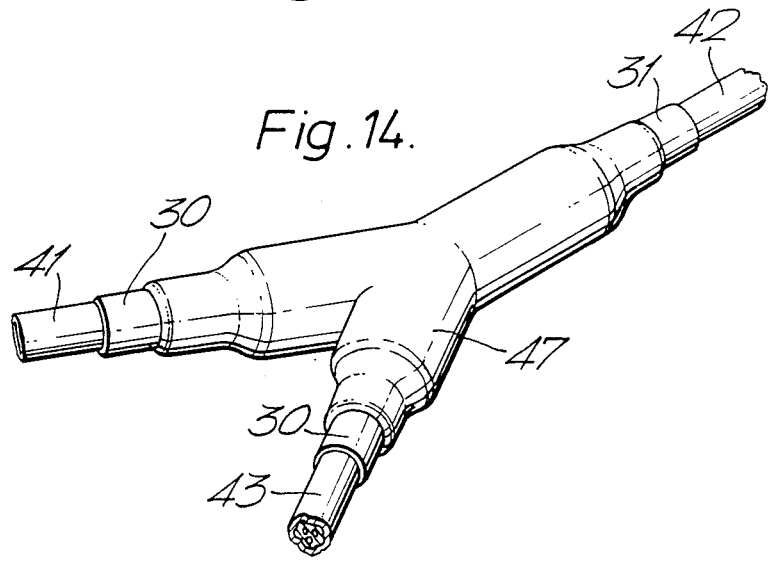
FIG. 14 is a perspective view of the joint shown in FIGS. 12 and 13 after completion.

FIGS. 12 to 14 show the assembly of a cable joint that is similar to the one shown in FIGS. 1 to 3 but which enables three cables 41, 42 and 43 to be jointed to form a branch-off. A connector arrangement that is the same as that shown in FIGS. 10 and 11 but using three-way crimp connectors is employed, and the component blocks 9 and 10 fit together substantially as described above. The method of forming a branch-off using this arrangement is substantially the same as that described above for forming a one-to-one joint with the exception that instead of the heat-shrinkable sleeve 7 a "Y" shaped sleeve 47 having three outlets is positioned over two cables 41 and 43 before the cables are connected.

FIG. 15 shows an arrangement for forming a joint in a coaxial cable and FIG. 16 shows the assembled joint formed by such an arrangement before heating. The arrangement comprises a barrel crimp connector 50 which may have a solid central portion but need not have a solid portion if the coaxial cable to be connected has a solid central conductor. Two identical fusible blocks 52 and 53 are provided for positioning about the crimp connector 50, and a shield portion 54 formed from a solder impregnated braid is provided for positioning about the crimp connector 50 and the fusible blocks 52 and 53. Two further fusible blocks 55 and 56 are capable of being positioned about the shield portion 54 and finally a heat-recoverable polyamide sleeve 57 is provided for positioning about the blocks 55 and 56.

In order to form a joint between two coaxial cables the cable jackets 58, shields 59 and dielectrics 60 are cut back in a stepped manner and the shield portion 54 and heat-recoverable sleeve 57 are each slid over one of the cable ends. The central conductors are then crimped together by means of the crimp connector 50 and the fusible blocks 52 and 53 are positioned over the connection so formed so that each end of the fusible blocks abuts the end of one of the cable dielectrics. The shield portion 54 is then slid over the joint, the length of exposed dielectric of each cable being such that each of the shield portion overlies the exposed proximate end of each cable shield 59. The two further fusible blocks 55 and 56 are then positioned about the shield portion 54 and proximate ends of each cable jacket 58 and the heat-recoverable sleeve is slid over the fusible blocks to enclose the joint.

The assembled joint is then heated for a few minutes as described above until the fusible blocks 52, 53, 55 and 56 have melted and the sleeve 57 has recovered and, after inspecting the joint for any air voids, the joint is allowed to cool.

We claim:

1. An arrangement for forming a joint between a plurality of electrical cables each of which comprises a plurality of electrical wires enclosed by a cable jacket, which arrangement comprises:
    (a) a connector arrangement for forming an electrical connection between corresponding electrical wires of each of the electrical cables;
    (b) a plurality of shaped component blocks formed from a thermoplastic polymer, said blocks being capable of being assembled together about the connector arrangement and a plurality of electrical wires to form a fusible composition block which substantially encloses the connector arrangement and a plurality of electrical wires, said component blocks having configurations such that, when they are assembled together about the connetor arrangement and the connected electrical wires the fusible block so formed has substantially no internal voids; and
    (c) a heat-shrinkable sleeve which can be positioned around the fusible block and the proximate ends of the cables and recovered thereon, the heat-shrinkable sleeve having a recovery temperature which is in the range of from 160° C. to 200° C. and which is at least 10° C. above the melting point of the thermoplastic polymer.

2. An arrangement as claimed in claim 1, wherein the connector arrangement comprises a plurality of crimp connectors.

3. An arrangement as claimed in claim 1, wherein the connector arrangement comprises a plurality of connectors each of which has hollow portions for receiving corresponding electrical wires and has a solid cross-section along part of its length.

4. An arrangement as claimed in claim 1, wherein the polymer forming the fusible block has a melting point in the range of from 120° to 160° C.

5. An arrangement as claimed in claim 4, wherein the polymer forming the fusible block comprises polyethylene.

6. An arrangement as claimed in claim 1, wherein the heat-shrinkable sleeve is capable of exerting a maximum radial force on the fusible block of at least 6 MPa during or after recovery.

7. An arrangement as claimed in claim 1, wherein the polymer forming the fusible block is substantially transparent at least above its melting point.

8. An arrangement as claimed in claim 1, wherein the heat-shrinkable sleeve is capable of exerting a maximum radial force on the fusible block of at least 4 MPa during or after recovery.

9. An arrangement as claimed in claim 1, wherein the heat-shrinkable sleeve is substantially transparent at least above its recovery temperature.

10. An arrangement as claimed in claim 1, wherein the heat-shrinkable sleeve comprises nylon 12.

11. An arrangement for forming a joint between a plurality of electrical cables each of which comprises one or more electrical wires enclosed by a cable jacket, which arrangement comprises:
    (a) a connector arrangement for forming electrical connections between wires of the cables;
    (b) a plurality of shaped component blocks formed from a thermoplastic polymer which said blocks can be assembled together about the connector arrangement and one or more wires to enclose the connector arrangement and one or more wires in a fusible block of thermoplastic polymer, the shaped component blocks having configurations such that, when they are assembled together about the connector arrangement and connected wires, the fusible block so formed has substantially no internal voids; and
    (c) a heat-shrinkable sleeve which can be positioned around the fusible block and proximate ends of the cable and recovered thereon, the sleeve having a recovery temperature of at least 10° C. above the melting point of the thermoplastic polymer.

12. An arrangement as claimed in claim 11, wherein the connector arrangement comprises a plurality of connectors that are set in a supporting block formed from the same polymer as the fusible block.

13. An arrangement as claimed in claim 11 for forming a joint between a plurality of shielded cables, further comprising a tubular shield portion to be positioned about the connector arrangement and connected to each cable shield.

14. An arrangement for forming a joint between a plurality of shielded electrical cables each of which comprises one or more electrical wires enclosed by a cable shield and a cable jacket, which arrangement comprises:

(a) a connector arrangement for forming an electrical connection between corresponding electrical wires of each of the electrical cables;

(b) a tubular shield portion that is capable of being positioned about the connector arrangement and of being connected to each cable shield;

(c) a plurality of shaped component blocks formed from a thermoplastic polymer, which blocks can be assembled together about the connector arrangement and connected wires to form a fusible block of thermoplastic polymer, at least one of the component blocks being capable of being positioned about the connector arrangement and inside the tubular shield portion, and at least one of the fusible blocks being capable of being positioned on the exterior of the shield portion, the shaped component blocks having configurations such that, when they are assembled together about the connector arrangement and connected wires, the fusible block has substantially no internal voids, and;

(d) a heat-shrinkable sleeve which can be positioned around the fusible block and the proximate ends of the cables and recovered thereon, the heat-shrinkable sleeve having a recovery temperature which is in the range of from 160° C. to 200° C. and which is at least 10° C. above the melting point of the thermoplastic polymer.

15. An arrangement for forming a joint between a plurality of electrical cables each of which comprises a plurality of electrical wires enclosed by a cable jacket, which arrangement comprises:

(a) a connector arrangement for forming an electrical connection between a plurality of electrical wires corresponding to a plurality of electrical cables;

(b) a plurality of shaped component blocks formed from a thermoplastic polymer, said blocks being capable of being assembled together about the connector arrangement and a plurality of electrical wires to form a fusible composite block which substantially encloses the connector arrangement and a plurality of electrical wires, one of said component blocks having a raised section that fits into a recess of another of said component blocks such that when they are assembled together about the connector arrangement and a plurality of electrical wires the fusible block so formed has substantially no internal voids; and (c) a heat-shrinkable sleeve which can be positioned around the fusible block and a proximate end of each of a plurality of electrical cables and recovered thereon, the heat-shrinkable sleeve having a recovery temperature and the fusible block having a melting point such that upon recovery of the heat-shrinkable sleeve, the fusible block melts.

16. An arrangement for forming a joint between a plurality of electrical cables each of which comprises a plurality of electrical wires enclosed by a cable jacket, which arrangement comprises:

(a) a connector arrangement for forming an electrical connection between a plurality of electrical wires corresponding to a plurality of electrical cables;

(b) a plurality of shaped component blocks formed from a thermoplastic polymer, said blocks being capable of being assembled together about the connector arrangement and a plurality of electrical wires to form a fusible composite block which substantially encloses the connector arrangement and a plurality of electrical wires, said component blocks having configurations such that when they are assembled together about the connector arrangement and a plurality of electrical wires the fusible block so formed has substantially no internal voids; and (c) a heat-shrinkable sleeve which can be positioned around the fusible block and a proximate end of each of a plurality of electrical cables and recovered thereon, the fusible block having a melting point in the range from 120° C. to 160° C. so that upon recovery of the heat-shrinkable sleeve, the fusible block melts.

17. An arrangement for forming a joint between a plurality of shielded electrical cables each of which comprises one or more electrical wires enclosed by a cable shield and a cable jacket, which arrangement comprises:

(a) a connector arrangement for forming an electrical connection between a plurality of electrical wires corresponding to a plurality of electrical cables;

(b) a tubular shield portion that is capable of being positioned about the connector arrangement and of being connected to a cable shield;

(c) a plurality of shaped component blocks formed from a thermoplastic polymer, which blocks can be assembled together about the connector arrangement and a plurality of electrical wires to form a fusible block of thermoplastic polymer, at least one of the component blocks being capable of being positioned about the connector arrangement and inside the tubular shield portion, and at least one of the fusible blocks being capable of being positioned on the exterior of the tubular shield portion, the shaped component blocks having configurations such that, when they are assembled together about the connector arrangement and a plurality of electrical wires, the fusible block so formed has substantially no internal voids, and;

(d) a heat-shrinkable sleeve which can be positioned around the fusible block and a proximate end of each of a plurality of electrical cables and recovered thereon, the fusible block having a melting point in the range from 120° C. to 160° C. so that upon recovery of the heat-shrinkable sleeve, the fusible block melts.

18. A method of forming a joint between a plurality of electrical cables each of which comprises one or more electrical wires enclosed by a cable jacket, which comprises:

(a) forming an electrical connection between a plurality of wires corresponding to a plurality of electrical cables;

(b) positioning a shaped fusible block formed from a plurality of shaped component blocks each formed from a thermoplastic polymer having a melting point in the range of 120° C. to 160° C. about a plurality of electrical wires to enclose a plurality of electrical wires and a proximate end of each of a plurality of electrical cables; and (c) positioning a heat-shrinkable sleeve around the fusible block and a proximate end of each of a plurality of electrical cables, heating the sleeve and fusible block to cause the sleeve to recover about the fusible block and to cause the fusible block to melt, and then allowing the sleeve and fusible block to cool.

* * * * *